(12) United States Patent (10) Patent No.: US 9,137,255 B2
Lambert (45) Date of Patent: Sep. 15, 2015

(54) VERIFYING SERVER IDENTITY

(75) Inventor: Paul A. Lambert, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 242 days.

(21) Appl. No.: 13/493,544

(22) Filed: Jun. 11, 2012

(65) Prior Publication Data

US 2013/0007850 A1    Jan. 3, 2013

Related U.S. Application Data

(60) Provisional application No. 61/503,064, filed on Jun. 30, 2011.

(51) Int. Cl.
*H04L 29/06* (2006.01)
*H04W 12/06* (2009.01)

(52) U.S. Cl.
CPC ............ *H04L 63/126* (2013.01); *H04L 63/162* (2013.01); *H04W 12/06* (2013.01); *H04L 63/0892* (2013.01)

(58) Field of Classification Search
CPC .... H04L 63/126; H04L 63/162; H04W 12/12
See application file for complete search history.

(56) References Cited

U.S. PATENT DOCUMENTS

| 7,171,555 | B1 * | 1/2007 | Salowey et al. ............... 713/156 |
| 7,930,428 | B2 * | 4/2011 | Drako ............................ 709/245 |
| 8,064,598 | B2 * | 11/2011 | Vaha-Sipila et al. .......... 380/247 |
| 8,281,371 | B1 * | 10/2012 | Chickering et al. ............... 726/4 |
| 8,566,596 | B2 * | 10/2013 | Stephenson et al. .......... 713/176 |
| 8,584,214 | B2 * | 11/2013 | Upp et al. ......................... 726/6 |
| 8,935,754 | B2 * | 1/2015 | McCann et al. ................... 726/4 |
| 2007/0083670 | A1 * | 4/2007 | Kelley et al. ................... 709/245 |
| 2008/0148044 | A1 * | 6/2008 | Upp et al. ....................... 713/156 |
| 2009/0274094 | A1 * | 11/2009 | Engwer .......................... 370/328 |
| 2010/0146272 | A1 * | 6/2010 | Centonza et al. ............. 713/168 |
| 2011/0197068 | A1 * | 8/2011 | Holden et al. ................. 713/175 |
| 2012/0076118 | A1 * | 3/2012 | Montemurro et al. ........ 370/338 |
| 2012/0281609 | A1 * | 11/2012 | Kasslin et al. ................. 370/312 |

FOREIGN PATENT DOCUMENTS

GB 2448003 A * 10/2008

OTHER PUBLICATIONS

"IEEE Std 802.11u, Part 11: Wireless LAN Medium Access Control (MAC) and Physical Layer (PHY) Specifications, Amendment 9: Interworking with External Networks", IEEE Computer Society, Feb. 25, 2011, 208 pages.*

David, et al.,"Extensible Authentication Protocols for IEEE Standards 802.11 and 802.16", In Proceedings of the International Conference on Mobile Technology, Applications & Systems, Sep. 2008, 8 pages.

(Continued)

*Primary Examiner* — Victor Lesniewski (57) ABSTRACT

The present disclosure describes techniques for verifying server identity. In some aspects a grant to access resources associated with a server is received from the server via a wireless network through which an address of the server is undeterminable. The grant includes the address of the server, and the server is verified as a granting authority for the resources based on the address of the server and known address information for the granting authority of the services.

20 Claims, 6 Drawing Sheets

(56) References Cited

OTHER PUBLICATIONS

"IEEE 802.11u-2011 Part 11: Wireless LAN Medium Access Control (MAC) and Physical Layer (PHY) Specifications—Amendment 9: Interworking with External Networks", Retrieved from: <http://standards.ieee.org/getieee802/download/802.11u-2011.pdf> on Jul. 6, 2012, Feb. 25, 2011, 207 pages.

"PCT Search Report and Written Opinion", Application No. PCT/US2012/042012, Aug. 9, 2012, 12 pages.

\* cited by examiner

VERIFYING SERVER IDENTITY

RELATED APPLICATIONS

This present disclosure claims priority to U.S. Provisional Patent Application Ser. No. 61/503,064 filed Jun. 30, 2011, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Wireless local-area-networks (WLANs) often enable computing devices to exchange data or obtain services of a network via a wireless access point. When deployed in public settings, access points are typically managed as hotspots, which provide users with internet access or other services for a one-time or subscription-based fee. To access the Internet or these services, a user can register with a service provider that controls the hotspot. Once registered with a service provider, a user may be authenticated, which allows the user to access resources available through the hotspot whenever the user is within range.

When a user initially encounters a hotspot managed by the service provider, however, the authentication process to access the resources may not be secure. The authentication process is often based on credentials provided by a server associated with the service provider. Details of these credentials, though, are not verifiable by the user because an address of the server providing the credentials is obscured by communication protocols employed by hotspots. Malicious entities with forged credentials can imitate or corrupt the authentication process because the user is unable to verify a validity of a server providing the credentials. Once the authentication process is corrupted, the malicious entity can direct the user to unsecure or corrupted network resources enabling information communicated by the user to be compromised or stolen.

SUMMARY

This summary is provided to introduce subject matter that is further described below in the Detailed Description and Drawings. Accordingly, this Summary should not be considered to describe essential features nor used to limit the scope of the claimed subject matter.

A method is described for receiving, from a server and via a wireless network through which an address of the server is undeterminable, a grant to access resources associated with the server, the grant including the address of the server, and verifying, based on the address of the server and known address information for a granting authority of the services, that the server is the granting authority for the resources.

Another method is described for receiving, from an enrollment server, realm information for a realm associated with an access point and identification information of an authentication server for the realm, transmitting an authentication request to access the resources of the realm to the access point, the access point configured to communicate with a server for authentication via a proxy network that obscures an identity of the server, receiving an authentication response granting access to the resources from the access point, the authentication response including a credential of the authentication server, and verifying that the server is the authentication server for the realm effective to enable access of the resources via the access point, or failing to verify that the server is the authentication server for the realm effective to disable access of the resources via the access point.

Still another method is described for transmitting a query for information identifying resources of a service provider to an access point via a data-link layer of a wireless communication protocol, receiving a query response from a first server associated with the service provider, the response including the information identifying the resources available and domain name system (DNS) information associated with authentication servers for the resources, transmitting an authentication request to access the resources of the service provider, the access point configured to proxy authentication communication with a second server having a DNS name that is undeterminable from the data-link layer, receiving an authentication response granting access to the resources, the authentication response including a credential having DNS name information of the second server, and verifying that the second server is the authentication server for the resources based on the DNS information and the DNS name information of the second server effective to enable access of the resources.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Conventional techniques for authenticating with a server to access network resources or services via an access point may expose users or their information to malicious entities. These malicious entities can employ forged credentials and direct users to unsecure or corrupt network resources because credentials of an authentication server may not be verifiable through communication with the access point. This disclosure describes techniques of verifying server identity based on information included in a grant and information known about a granting authority. The information included in the grant can be compared with the information known about the granting authority to verify that the server is associated with resources or services a user is attempting to access. By so doing, a user can be prevented from accessing resources of malicious entities that employ forged credentials, corrupt resources, or unsecure services to steal user information.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
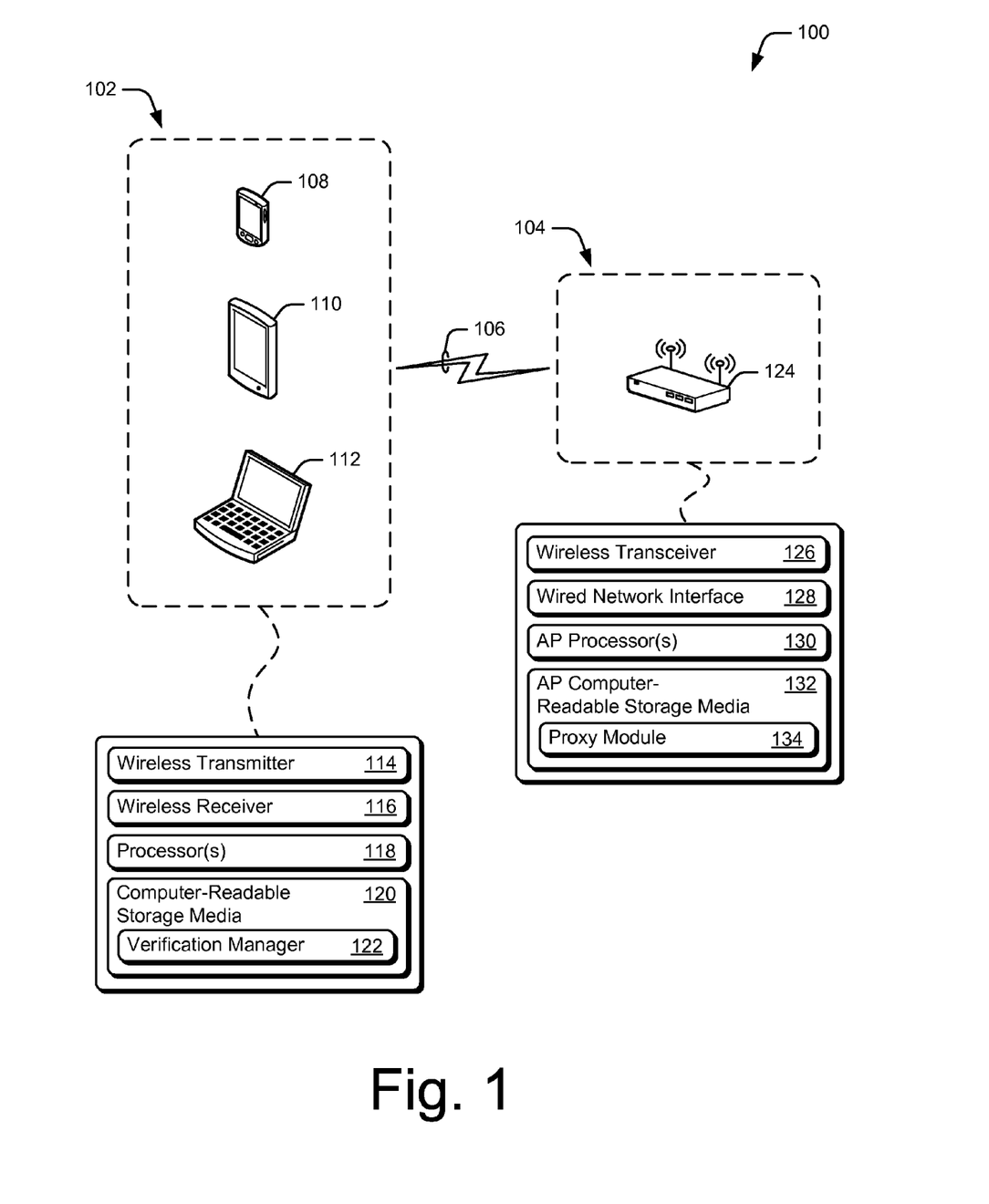
FIG. 1 illustrates an operating environment having wireless devices in accordance with one or more aspects.

FIG. 1 illustrates an example operating environment 100 having wireless devices 102 and gateway device 104, each of which are capable of communicating data, packets, and/or frames over a wireless connection 106, such as a wireless-local-area network (WLAN). Wireless devices 102 include smart-phone 108, tablet computer 110, and laptop computer 112. Although not shown, other configurations of wireless devices 102 are also contemplated such as a desktop computer, server, mobile-internet device (MID), mobile gaming console, electronic readers or books (e-readers or e-books), internet protocol enabled televisions (IP TVs), and so on.

Each wireless device 102 includes a wireless transmitter 114 and a wireless receiver 116 for providing a wireless interface to handle various communication protocols, such as for example IEEE 802.11-2007, IEEE 802.11n, IEEE 802.11u, and the like. For example, wireless device 102 can communicate public action frames via a data-link layer when implementing the IEEE 802.11u protocol. This data-link layer communication (e.g., layer 2 transport) may include generic advertisement service (GAS) frames communicated between wireless devices 102 and gateway device 104. These GAS frames may include access network query protocol (ANQP) elements useful for discovery and selection of wireless networks prior to association or authentication. Transmitter 114 and receiver 116 may be separate (shown) or combined (not shown) and may be hardware combined with or separate from firmware or software.

Wireless devices 102 also include processor(s) 118, computer-readable storage media 120 (CRM 120), and verification manager 122, which, in one implementation, is embodied on CRM 120. Processor 118 can be any suitable type of processor, either single-core or multi-core, for executing instructions or code associated with applications and/or an operating system of the wireless device 102. Processor 118 may be constructed with or fabricated from any suitable material such as silicon or other semiconductors. CRM 120 may include any suitable memory or storage device such as random-access memory (RAM), static RAM (SRAM), non-volatile RAM (NVRAM), read-only memory (ROM), or Flash memory useful to store data of applications and/or an operating system of the wireless device 102. How verification manager 122 is implemented and used varies and is described below.

Wireless devices 102 may be configured as client devices in a wireless network having an infrastructure-based topology, such as when connecting to gateway device 104. Alternately or additionally, wireless devices 102 may be configured as peer-to-peer devices enabling communication with other wireless devices 102. In some cases, a wireless device 102 may concurrently associate with gateway device 104 and a peer wireless device 102 extending services or functionalities provided by gateway device 104 to the peer wireless device 102.

Gateway device 104 includes wireless access point 124 (access point 124). Other gateway devices 104 contemplated include various networking devices, such as routers, mobile hotspots, wireless repeaters, wireless devices configured to share a wireless connection, and so on. Gateway device 104 may provide access to resources, services (e.g., capabilities or functions), the Internet, or other networks communicatively coupled with gateway device 104. For example, tablet computer 110 is able to access the Internet when connected wirelessly to gateway device 104.

Gateway device 104 includes wireless transceiver 126, which provides a wireless interface to handle various communication protocols, such as those mentioned above and elsewhere herein. Although shown as a single transceiver, wireless transceiver 126 may be implemented as a separate transmitter and receiver, and may be hardware combined with or separate from firmware or software. Wired network interface 128 of gateway device 104 enables communication with other networks, which is described in greater detail below. Gateway device 104 also includes micro-processor(s) 130 (μprocessor 130), gateway computer-readable storage media 132 (gateway CRM 132), and proxy module 134, which, in one implementation, is embodied on gateway CRM 132. Gateway CRM 132 may include any suitable memory or storage device such as static RAM (SRAM), ROM, or Flash memory useful to store data of applications and/or an operating system of the gateway device 104.

Proxy module 134 enables gateway device 104 to proxy communications between networks associated with wireless transceiver 126 and networks associated with wired interface 128. Communications may be proxied across different layers of a communication protocol or model by proxy module 134. For example, proxy module 134 may relay data received at a data-link layer via wireless transceiver 126 at a network or application layer via wired interface 128. When communication is proxied across different layers of a communication protocol or different communication protocols, an end point device (e.g., wireless device 102) may not be able to determine an address of an entity from which communication originates. For example, wireless device 102 communicating with gateway device 104 at a data-link layer may not be able to determine a domain name system (DNS) address or an internet protocol (IP) address of a server transmitting information at an IP or application layer.

Figure 2:
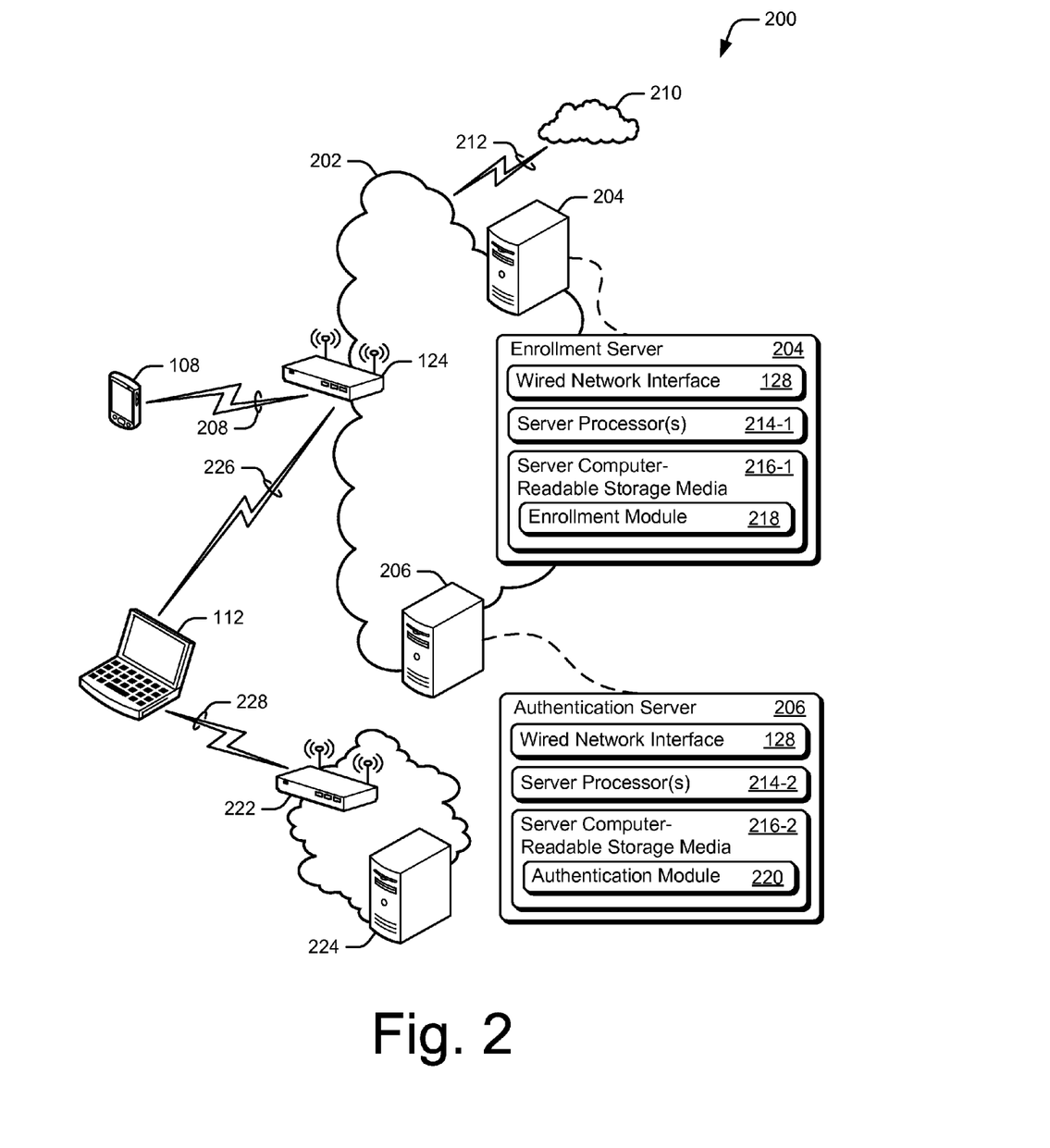
FIG. 2 illustrates an example of devices of FIG. 1 communicating in accordance with one or more aspects.

FIG. 2 illustrates an example of device environment 200 that includes a proxy network 202 through which enrollment server 204 and authentication server 206 are accessible. Proxy network 202 may be implemented using any suitable type of proxy service, such as a remote-authentication dial-in user service (RADIUS). Authentication server 206 may serve as an authentication, authorization, and accounting (AAA) server for proxy network 202. Communication within proxy network may use transport layer security (TLS) or tunneled transport layer security (TTLS) of an extensible authentication protocol (EAP) for security purposes. Wireless devices 102 may access proxy network 202 through gateway device 104. For example, smart-phone 102 may access proxy network 202 via wireless connection 208. Once connected with proxy network 202, network resources 210 associated with proxy network via connection 212 can be accessed. Network resources 210 may include any type of resource or service, such as internet access, cloud services, remote data access, or access to a private network.

Network resources 210 may be provided by a service provider (not shown) that controls access to them. Enrollment server 204 and authentication server 206 may also be associated with the service provider to administer enrollment and authentication of network resources 210 respectively. In some cases, network resources 210 may belong to a realm or domain of a service provider. In such cases, network access identifier (NAI) realm information describes the network resources 210 that are accessible from gateway device 104 and/or information useful to connect with gateway device 104. For example, NAI realm information may include a service set identifier (SSID), passphrase, encryption key, security code, or any other suitable information useful to connect to or associate with gateway device 104.

Enrollment server 204 and authentication server 206 can be similarly configured as server devices. These server devices each include wired interface 128, server processor(s) 214-1, 214-2, server computer-readable storage media 216-1, 216-2 (server CRM 216-1, 216-2). The server device can communicate data with proxy network 202 or other networks (e.g., the Internet) via wired interface 128. For example, data may be communicated between access point 124, enrollment server 204, or authentication server 206 via respective wired interfaces 128.

Server processors 214-1, 214-2 can be any suitable type of processor, either single-core or multi-core, for executing instructions or code associated with applications and/or an operating system of enrollment server 204 or authentication 206. Server processors 214-1, 214-2 may be constructed with or fabricated from any suitable material such as silicon or other semiconductors. Server CRM 216-1, 216-2 may include any suitable memory or storage device such as random-access memory (RAM), static RAM (SRAM), non-volatile RAM (NVRAM), read-only memory (ROM), or Flash memory useful to store data of applications and/or an operating system of the wireless device 102. Enrollment module 218 may be useful to enroll users attempting to access network resources 210. Authentication module 220 may be useful for authenticating users attempting to access network resources 210.

For example, authentication module 220 may store credentials for authentication server 206. These credentials may include certificates signed by a trusted authority that are useful to authenticate clients accessing network resources 210. Alternately or additionally, these credentials may include information associated with authentication server, such as a domain name system (DNS) address. In some cases, the DNS address of authentication server 206 may be obscured from wireless devices 102 because data-link layer communication protocols employed by gateway device 104 obscure internet protocol (IP) or DNS information.

Device environment 200 also includes malicious devices, rogue access point 222 and rogue server 224. Rogue access point 222 and/or rogue server 224 may be presented by malicious entities to appear similar to or the same as access point 124 and proxy network 202, such as by copying an SSID or presenting forged credentials. For example, a laptop computer may be configured to appear as rogue access point 222 and rogue server 224 in an attempt to intercept user communications intended for access point 124. A user unable to verify an identity of rogue server 224 when connected via wireless connection 226 may be directed by malicious entities to unsecure network resources if the user proceeds with network access.

Techniques of Verifying Server Identity

The following discussion describes techniques for verifying server identity. These techniques can be implemented using the previously described environments or entities, such as verification manager 122 of FIG. 1 embodied on a wireless device 102. These techniques include methods illustrated in FIGS. 3, 4, and 5, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
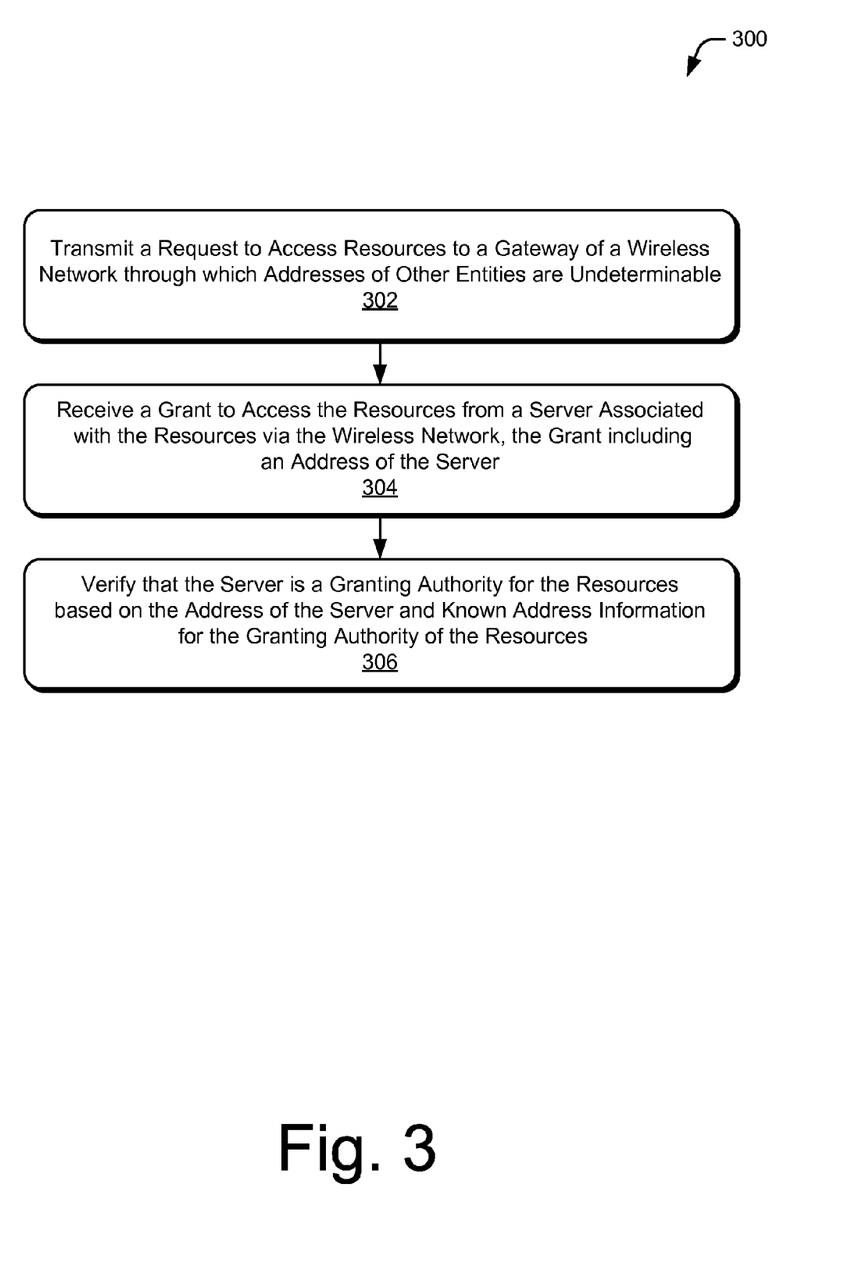
FIG. 3 illustrates a method of verifying that a server is a granting authority based on an address included in the grant.

FIG. 3 depicts a method 300 for verifying that a server is a granting authority based on an address included in or with the grant, including operations performed by verification manager 122 of FIG. 1.

At 302, a request to access resources of a wireless network is transmitted to a gateway of the wireless network. The gateway or wireless network may be configured such that addresses of other entities may be undeterminable through the wireless network (e.g., a proxy network). The wireless network can be a WLAN associated with a hotspot provided by an access point. The resources may be provided by a service provider administering the hotspot. For example, an internet service provider (ISP) associated with a hotspot may provide internet access, cloud services, or remote access to data. In some cases, communication with the wireless network is transacted via a data-link layer of a wireless communication protocol. In such cases, a wireless device and gateway device may communicate in accordance with IEEE 802.11u using public action frames.

As an example, consider smart-phone 108 in the context of FIG. 2, which shows smart-phone 108 communicating with access point 124 via wireless connection 208. Assume that a user of smart-phone 108 has walked into a coffee bar in which a hotspot is deployed by an ISP. Resources of the ISP (e.g., network resources 210) may be accessed by smart-phone 108 through access point 124. Here verification manager 122 of smart-phone 108 transmits a request to access point 124 to access network resources 210.

At 304, a grant to access the resources is received through the wireless network from a server, the grant including an address of the server. The server may be associated with the resources, the wireless network, or a service provider of the resources. The grant may be received at a data-link layer that obscures IP or DNS address information. For example, the grant may include a credential of the server, signed or otherwise, that includes a DNS address of the server.

In the context of the present example, verification manager 122 of smart-phone 108 receives a grant to access network resources 210 from authentication module 220 of authentication server 206. Assume here that the grant also includes a DNS address of authentication server 206. The grant, however, is communicated across proxy network 202 at the application layer and across wireless connection 208 at the data-link layer by proxy module 134. Because of this, smart-phone 108 is unable to objectively determine an originating IP or DNS address of the grant (e.g., the IP or DNS address of authentication server 206).

At 306, it is verified that the server is a granting authority for the resources based on the address of the server and known information about the granting authority. The known information may include a DNS address or a range of DNS addresses for authentication servers associated with the resources. By comparing the DNS address of the server with a known range of valid DNS addresses, it may be determined that the server is a granting authority for the resources. Verifying that the server is a granting authority for the resources may be effective to enable access to the resources.

The known information about the granting authority may have been previously received through a secure data exchange. For example, during an enrollment process with a service provider, known information identifying authentication servers may be received with realm information for the wireless network. Receiving the known information about the granting authority during a secure data exchange can prevent malicious entities from corrupting an authentication process.

Concluding the present example, verification manager 122 compares known DNS information for granting authorities with the DNS address included in the grant received from authentication module 220 of authentication server 206. Here assume that the DNS address included in the grant matches the known DNS information. As such, authentication server 206 is verified as a granting authority for network resources 210. Once verified, smart-phone 108 may access network resources 210 securely. Conversely, authentication server 206 may not have been verified if the DNS address included in the grant did not match the known DNS information. This would have been effective to prevent a smart-phone 108 from accessing possibly unsecure resources that may be presented by rogue server 224.

It should be noted that operations of methodologies described herein, including acts or actions of verification manager 122, may be performed autonomously or without user interaction or notification. By so doing, a user may be seamlessly authenticated with a secure network allowing access of network resources without being prompted for input for network selection or authentication.

Figure 4:
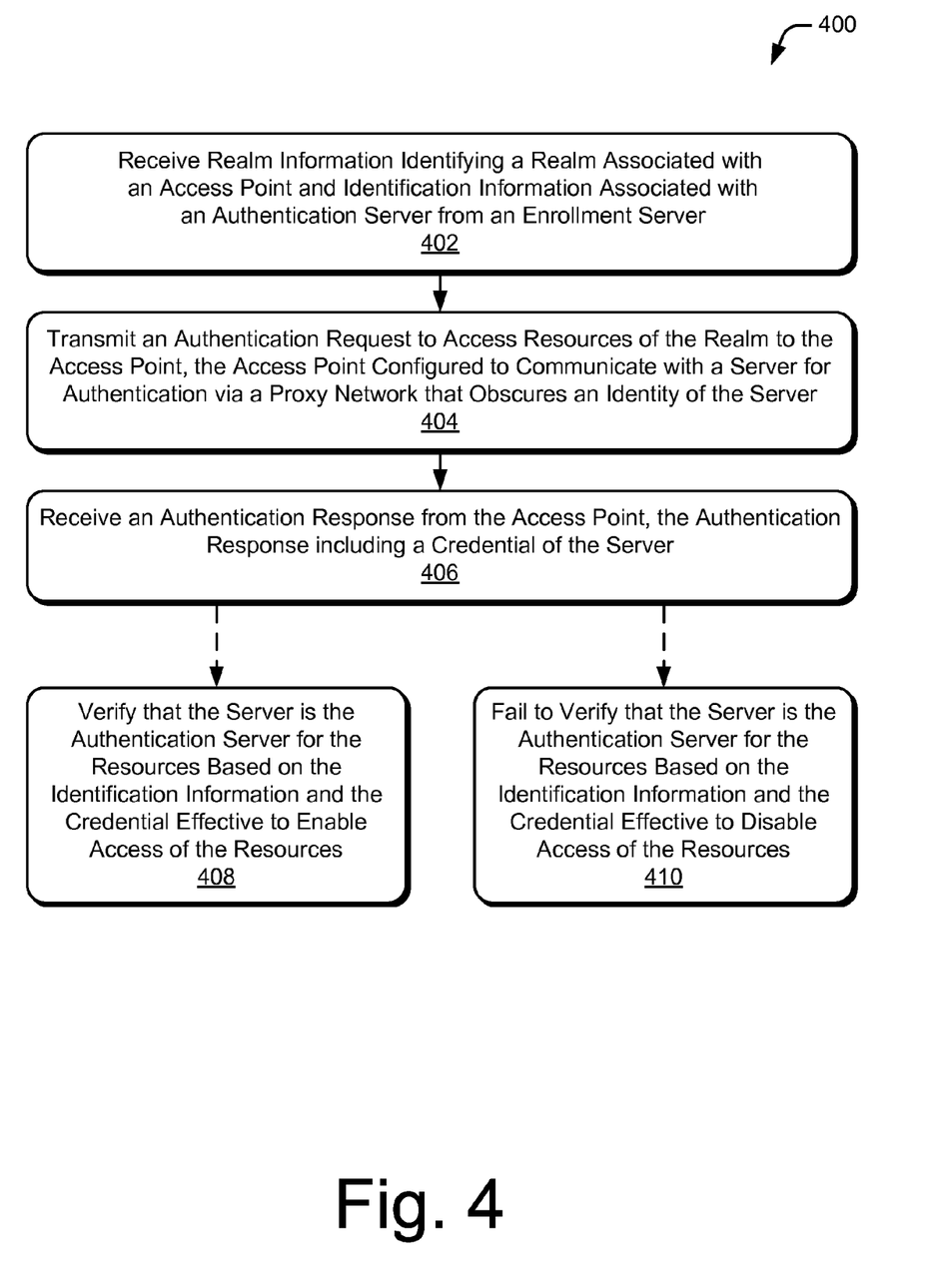
FIG. 4 illustrates a method of verifying that a server is an authentication server of a realm based on a credential of a server.

FIG. 4 depicts a method 400 for verifying that a server is an authentication server of a realm based on a credential of a server, including operations performed by verification manager 122 of FIG. 1.

At 402, realm information identifying a realm associated with an access point and identification information associated with an authentication server for the realm are received from an enrollment server. The realm information may also identify multiple realms associated with the access point. For example, an access point may be deployed as a hotspot that offers access to several realms of a service provider. In some cases, the realm information and the identification information are bound and/or received securely during an enrollment process.

The realm information may include information useful to access a wireless network associated with the access point, such as a service set identifier (SSID), an encryption key, or a pass phrase for the wireless network. The realm information may also include a list of services or resources accessible via the access point or information associated with a provider of the services or resources. The identification information associated with the authentication server may include a range of DNS addresses or other unique information associated with authentication servers of one or more realms.

As an example, consider laptop computer 112 in the context shown in FIG. 2, which shows laptop computer 112 communicating with access point 124 via wireless connection 226. Assume here that verification manager 122 of laptop computer 112 has requested information identifying resources available through access point 124. Verification manager 122 receives realm information and information identifying an authentication server for network resources 210 from access point 124.

At 404, an authentication request to access resources of the realm is transmitted to the access point. The access point may be configured to proxy authentication communications to or from a server for authentication. The resources of the realm may include internet access, cloud services, access to a private network, or any other suitable service. In some cases, the authentication request is transmitted to an authentication, authorization, and accounting server (AAA server) associated with the realm. The AAA server may be part of a proxy network implementing a remote-authentication dial-in user service (RADIUS) networking protocol. The AAA server or access point may also implement transport layer security (TLS) or tunneled transport layer security (TTLS) of an extensible authentication protocol (EAP). These security protocols may be implemented via an application layer of a communication protocol.

In the context of the present example, assume that rogue access point 222 is presenting an SSID matching that of access point 124. Also assume that wireless laptop 112 has begun communicating with rogue access point 222. Here verification manager 122 of laptop computer 112 transmits an authentication request to rogue access point 222. The request of verification manager 122 requests access to network resources 210 associated with the realm information previously received from enrollment server 204.

At 406, an authentication response granting access to resources is received from the access point. The authentication response may include a credential of the server. The credential may be signed or include information identifying the server, such as an IP address or DNS address. In some cases, the access point proxies the authentication response from the server thereby obscuring an originating IP or DNS address of the authentication response.

Continuing the ongoing example, verification manager 122 receives an authentication response from rogue access point 222. The authentication response includes forged credentials that include DNS information associated with rogue server 224. Assume here that the authentication response grants access to unsecure resources of rogue server 224 through rogue access point 222.

From operation 406, method 400 may either proceed to operation 408 or proceed to operation 410. At 408, it is verified that the server is an authentication server for the resources of the realms based on the identification information and the credential of the server. This may be effective to enable access of the resource via the access point. In some cases, the identification information of the server and the credential of the server are compared to verify an identity or validity of the server as an authentication server for the realm. For example, a DNS address associated with a response of an authentication server and a range of DNS addresses provided by the enrollment server can be used to verify the identity of the authentication server. By so doing, the resources can be validated as trusted resources once the identity of the authentication server is verified.

At 410, verification that the server is the authentication server for the resources of the realm fails based on the identification information and the credential of the server. This may be effective to disable access of the resource via the access point. In some cases, the identification information of the server and the credential of the server are compared to determine that the server is not associated with the realm or is deployed by a malicious entity. When the information does not match or appears to be fraudulent, an identity of the server providing authentication services may not be verified. By so doing, access to the resources can be disabled effective to protect information of a user from a potentially malicious device or entity.

Concluding the present example, verification manager 122 of laptop computer 112 compares the DNS information received from enrollment server 204 with the DNS information included in the response received from rogue server 224. Here assume that the DNS included in the authentication response does not match the DNS information received from enrollment server 204. As such, the identity of rogue server 224 is not verified and the resources are not validated as trusted resources. Laptop computer 112 is then prevented from accessing the non-validated resources in order to protect user information.

Figure 5:
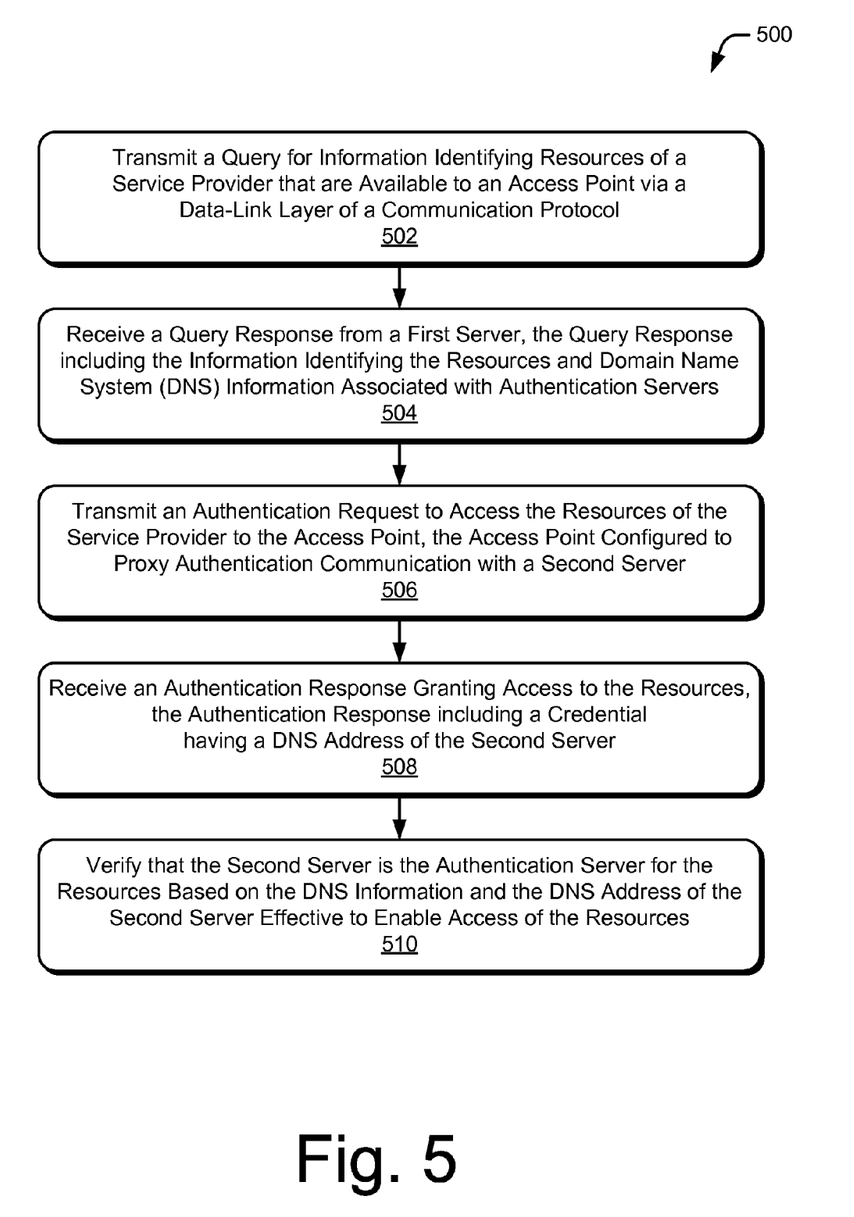
FIG. 5 illustrates a method of verifying that a server is an authentication server based on domain name system (DNS) information.

FIG. 5 depicts a method 500 for verifying that a server is an authentication server based on domain name system (DNS) information.

At 502, a query for information identifying resources of a service provider is transmitted to the access point. These resources may be available by being associated with the access point. The query can be communicated to the access point via a data-link layer of a wireless communication protocol, such as IEEE 802.11u. For example, the communication may be implemented using generic advertisement service (GAS) frames. These GAS frames may include elements of an access network query protocol (ANQP) requesting information identifying resources (e.g., realm information) available through the access point.

At 504, a query response from a first server associated with the service provider is received from the access point via the data-link layer. The query response may include the information identifying the resources available and domain name system (DNS) information associated with authentication servers for the resources. The first server may be an enrollment server associated with the service provider of the resources.

At 506, an authentication request to access the resources of the service provider is transmitted to the access point via the data-link layer. The access point may be configured to proxy authentication communication with a second server having a DNS address that is undeterminable from the data-link layer. In some cases, the communication may be proxied via TLS or TTLS protocols for security purposes.

At 508, an authentication response granting access to the resources is received from the access point via the data-link layer. The authentication response may include a credential having the DNS address of the second server. The second server may be an authentication server associated with the service provider of the resources. In some cases an IP or DNS address of the second server may not be determinable by a wireless device due to the data-link layer communication, which may not carry DNS or IP level information.

At 510, it is verified that the second server is the authentication server for the resources based on the DNS information received from the first server and the DNS address included in the authentication response. This may be effective to enable access of the resources via a non-data-link layer of the wireless communication protocol. For example, the access point may be accessed using Wireless Fidelity Protected Access II (WPA2) security protocol that implements TLS or TTLS. By so doing, resources of the access point can be securely authenticated and accessed without exposing user information to malicious entities.

System-on-Chip

Figure 6:
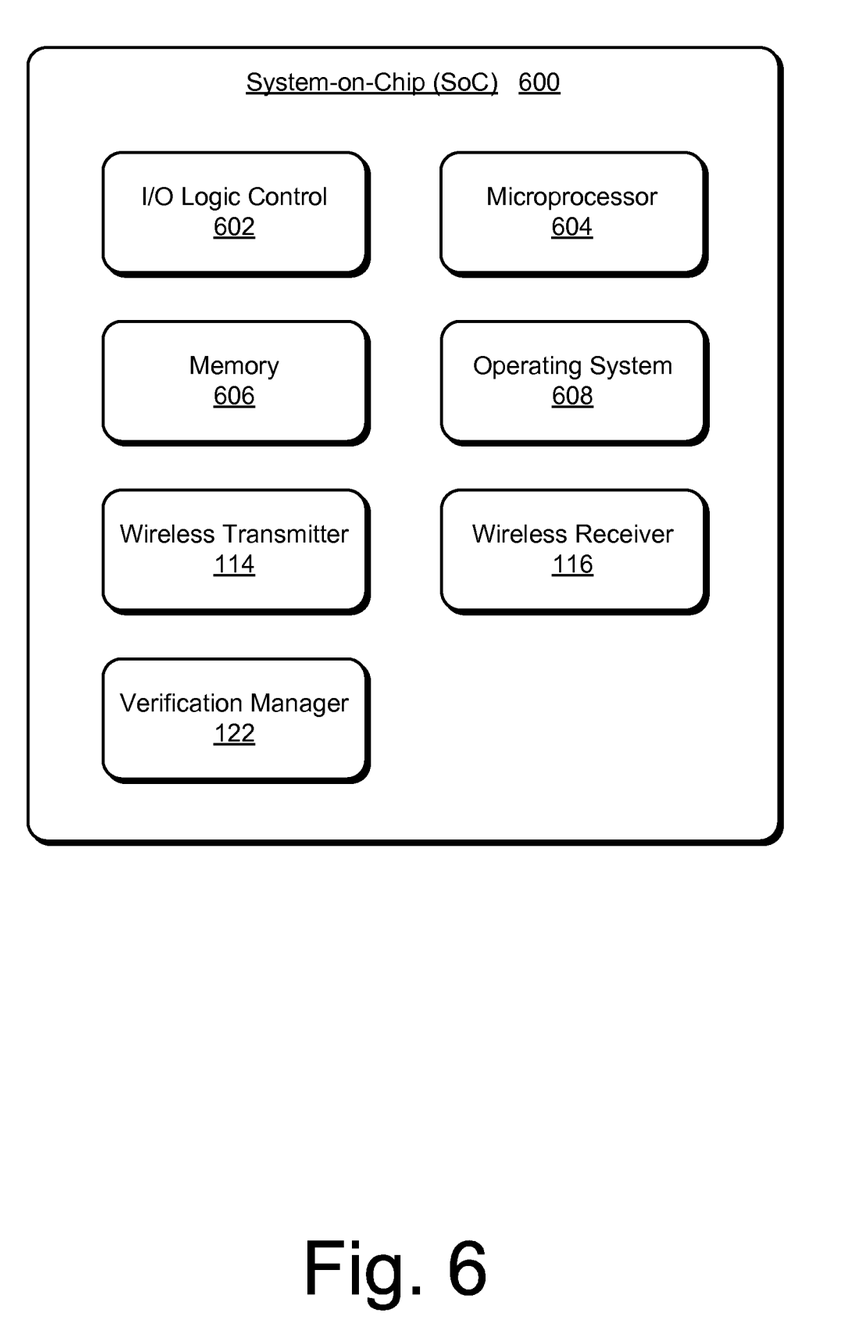
FIG. 6 illustrates a System-on-Chip (SoC) environment for implementing aspects of the techniques described herein.

FIG. 6 illustrates a System-on-Chip (SoC) 600, which can implement various embodiments described above. A SoC can be implemented in any suitable device, such as a video game console, IP enabled television, smart-phone, desktop computer, laptop computer, tablet computer, server, network-enabled printer, set-top box, printer, scanner, camera, picture frame, and/or any other type of device that may implement wireless connective technology.

SoC 600 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 600 can also include an integrated data bus (not shown) that couples the various components of the SoC for data communication between the components. A wireless communication device that includes SoC 600 can also be implemented with many combinations of differing components. In some cases, these differing components may be configured to implement concepts described herein over a wireless connection or interface.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., Flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes wireless transmitter 114, wireless receiver 116, and verification manager 122 (embodied as disparate or combined components as noted above). Examples of these various components, functions, and/or entities, and their corresponding functionality, are described with reference to the respective components of the environment 100 shown in FIG. 1 and FIG. 2.

Verification manager 122, either independently or in combination with other entities, can be implemented as computer-executable instructions maintained by memory 606 and executed by microprocessor 604 to implement various embodiments and/or features described herein. Verification manager 122 may also be provided integral with other entities of the SoC, such as integrated with one or both of I/O logic controller 602 or any packet-based interface within SoC 600. Alternatively or additionally, verification manager 122 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving, at a wireless device, via a publically accessible wireless network provided by an access point, from an enrollment server associated with an internet service provider that administers the publically accessible wireless network, and during an enrollment process with the internet service provider, one or more known domain name system (DNS) addresses for a granting authority of internet services associated with the internet service provider, the wireless device capable of accessing multiple wireless networks including the publically accessible wireless network;
receiving, at the wireless device, from an authentication server associated with the internet service provider, and via the publically accessible wireless network, a grant from the internet service provider to access internet services via the publically accessible wireless network, the grant including a domain name system (DNS) address of the authentication server, the DNS address of the authentication server being undeterminable through the publically accessible wireless network; and verifying, by the wireless device and based on the DNS address of the authentication server matching the one of one or more known DNS addresses for a granting authority of the internet services, that the authentication server is the granting authority for the internet services.

2. The method of claim 1, wherein the receiving via the publically accessible wireless network receives through a secure data exchange.

3. The method of claim 2, wherein the secure data exchange is part of the enrollment process administered by the enrollment server associated with the internet services.

4. The method of claim 1, wherein communication through the publically accessible wireless network occurs at a data-link layer of a communication protocol such that internet protocol (IP) or DNS information is obscured.

5. The method of claim 1, wherein the access point providing the wireless network serves as a communicative proxy for the authentication server.

6. The method of claim 1, wherein the authentication server is an authentication, authorization, and accounting (AAA) server for a domain to which the internet services belong.

7. The method of claim 1 further comprising, prior to receiving the grant from the internet service provider to access the internet services, transmitting, from the wireless device, a request requesting access to the internet services to the authentication server and via the publically accessible wireless network.

8. The method of claim 1, wherein the one or more known DNS addresses for a granting authority of the internet services comprises a range of DNS addresses.

9. The method of claim 1, wherein the internet services associated with the internet service provider include internet access, cloud services, or access to a private network, the internet access, cloud services, or access to the private network not associated with the wireless device prior to the receiving.

10. A method comprising:
receiving, at a wireless device, via a publically accessible wireless network provided by an access point, and from an enrollment server associated with an internet service provider that administers the publically accessible wireless network, realm information for a realm associated with the access point and identification information of an authentication server for the realm, the authentication server associated with the internet service provider, the identification information including one or more domain name system (DNS) addresses, the wireless device capable of accessing multiple wireless networks including the publically accessible wireless network;
transmitting, from the wireless device and to the access point, an authentication request to access internet services associated with the realm, the access point configured to communicate with an alleged authentication server for authentication via a proxy network that obscures an identity of the server;
receiving, at the wireless device and from the access point, an authentication response granting access to the internet services via the publically accessible wireless network, the authentication response including the DNS address of the alleged authentication server; and either:
verifying, by the wireless device and based on the DNS address of the alleged authentication server matching one of the one or more DNS addresses, that the alleged authentication server is the authentication server for the realm effective to enable access of the internet services via the access point; or
failing to verify, by the wireless device and based on the DNS address of the alleged authentication server not matching any of the one or more DNS addresses, that the alleged authentication server is the authentication server for the realm effective to disable access of the internet services via the access point.

11. The method of claim 10, wherein the access point or the server implements transport layer security (TLS) or tunneled transport layer security (TTLS) of an extensible authentication protocol (EAP).

12. The method of claim 10, wherein the authentication server is an authentication, authorization, and accounting server (AAA server) associated with the realm.

13. The method of claim 10, wherein the access point or the server communicate using a remote-authentication dial-in user service (RADIUS) networking protocol.

14. The method of claim 10, wherein the internet services of the realm include internet access, cloud services, or access to a private network.

15. The method of claim 10, wherein the wireless network provided by the access point supports communication in accordance with IEEE 802.11u.

16. The method of claim 15, wherein the realm information includes a service set identifier (SSID), an encryption key, or a pass phrase of the wireless network.

17. One or more computer-readable memory devices comprising computer-executable instructions that, when executed by one or more processors, implement a verification manager to:
transmit, to a publically accessible access point via a data-link layer of a wireless communication protocol and as a part of an enrollment process, a query for information identifying internet services of an internet service provider that are available through the publically accessible access point, the enrollment process effective to enable access to internet services associated with the internet service provider, the verification manager capable of accessing multiple access points including the publically accessible access point;
receive, from the publically accessible access point via the data-link layer and as part of the enrollment process, a query response from an enrollment server associated with the internet service provider, the query response including the information identifying the internet services available and one or more domain name system (DNS) addresses associated with authentication servers for the internet services;
transmit, to the publically accessible access point via the data-link layer, an authentication request to access the internet services of the internet service provider, the publically accessible access point configured to perform proxy authentication communication with another server having a DNS address that is undeterminable from the data-link layer;
receive, from the publically accessible access point via the data-link layer, an authentication response granting access to the internet services via the publically accessible access point, the authentication response including a credential having the DNS address of the other server; and
verifying, based on the DNS address of the other server matching one of the one or more DNS addresses associated with authentication servers for the internet services received from the enrollment server, that the other server is one of the authentication servers for the internet services effective to enable access to the internet services via a non-data-link layer of the wireless communication protocol.

18. The one or more computer-readable memory devices of claim 17, wherein the data-link layer communication is implemented using generic advertisement service (GAS) frames.

19. The one or more computer-readable memory devices of claim 18, wherein the query and query response are communicated in accordance with an access network query protocol (ANQP).

20. The one or more computer-readable memory devices of claim 17, wherein the one or more computer-readable memory devices are embodied on a System-on-Chip (SoC) and executed via a microprocessor of the SoC to implement the verification manager.

* * * * *